3,390,069
HORIZONTAL MERCURY CATHODE CELL WITH BOTTOM MOUNTED ANODE SUPPORT MEMBERS
Yoshio Utsugi, Shigeru Katsumata, and Katumi Onozaki, Tokyo, Japan, assignors to Asahidenka Kogyo Kabushiki Kaisha, Tokyo, Japan, a corporation of Japan
Filed May 22, 1964, Ser. No. 369,455
Claims priority, application Japan, May 24, 1963, 38/37,775; May 2, 1964, 39/34,142; May 9, 1964, 39/25,980
7 Claims. (Cl. 204—219)

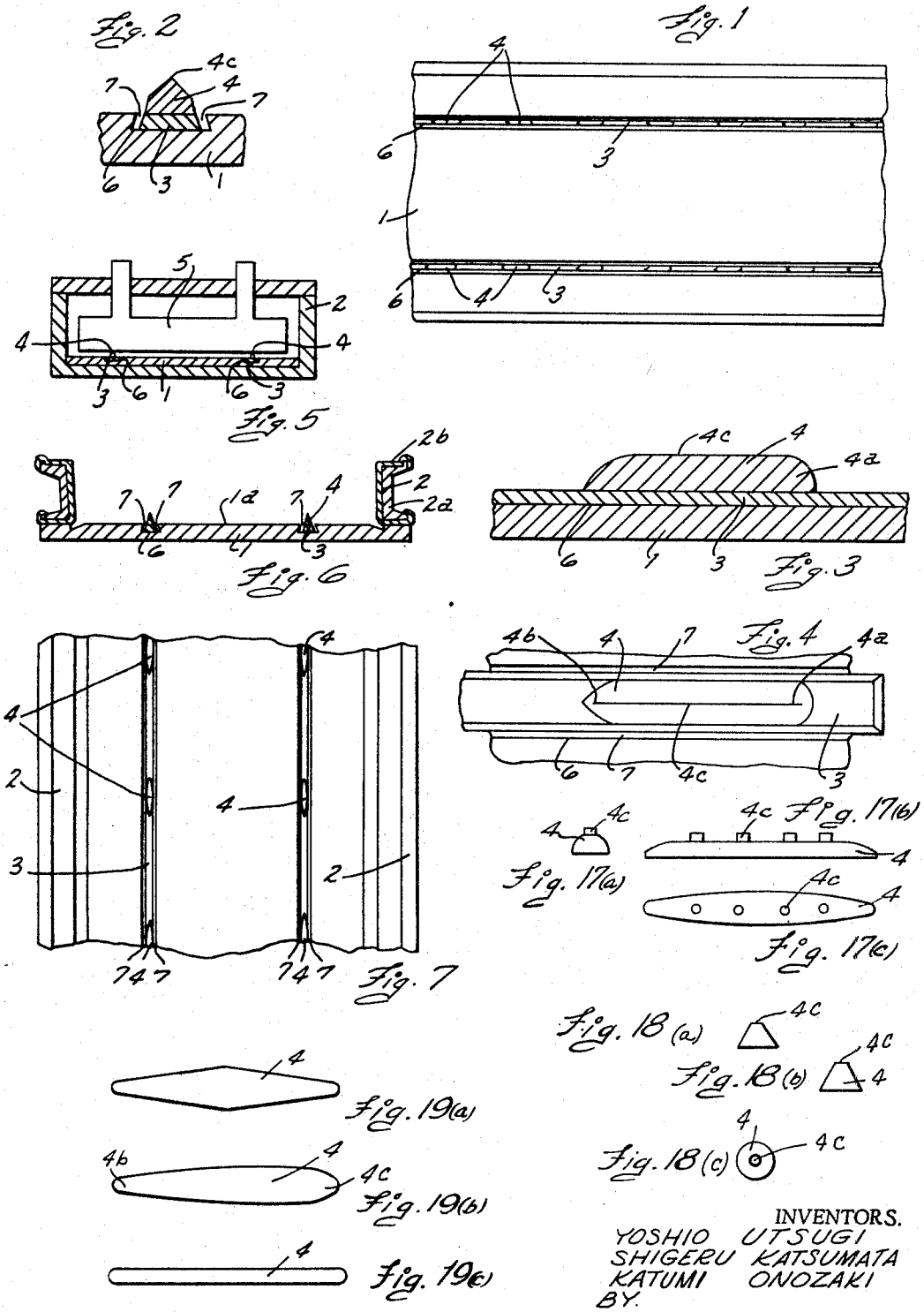

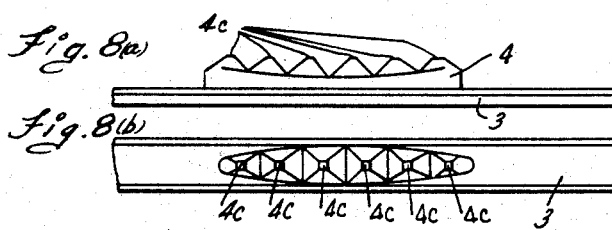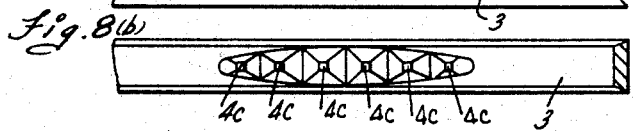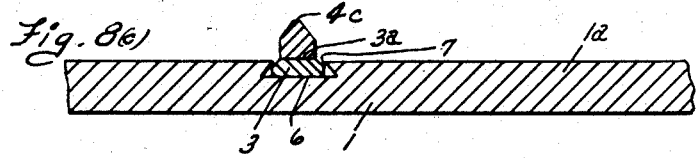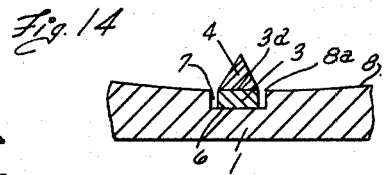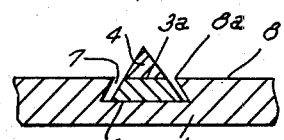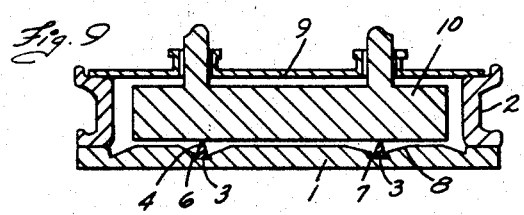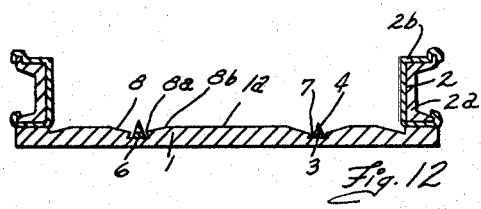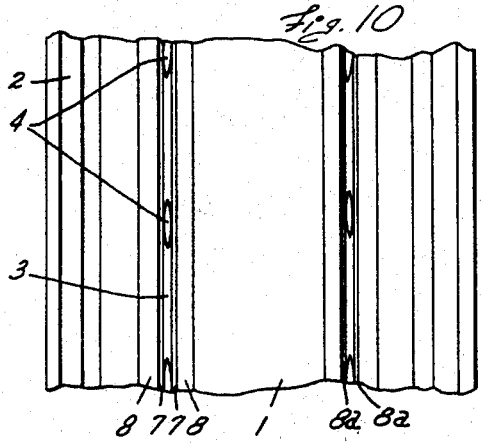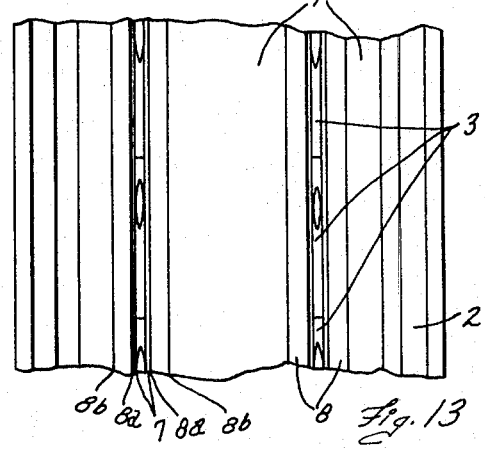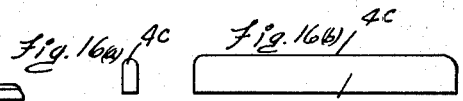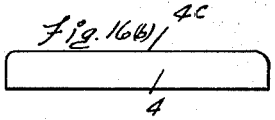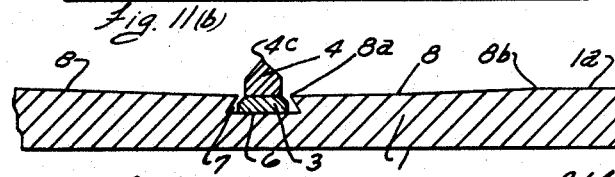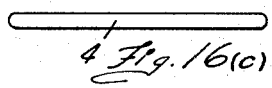

ABSTRACT OF THE DISCLOSURE

A bottom member for an amalgamating chamber of a horizontal mercury cathode cell in which the bottom plate is made of electrically conductive material and has at least two elongated parallel grooves in the upper side thereof. Elongated anode supporter supporting bodies are mounted in the grooves so that clearance spaces are formed between said bodies and the sidewalls of said grooves. Anode supporters made of insulating material are mounted on said bodies at spaced positions therealong.

This invention relates to improvements in a horizontal mercury cathode cell for electrolysis of alkali chloride solutions. More particularly, the present invention relates to improvements of the structure of a bottom portion of an amalgamating chamber and the structures of an anode supporting part used for obtaining automatic and continuous adjustment of the inter-electrode distance by using so-called spacers and of its related parts.

One of the most important things required to maximize the electric power efficiency of a horizontal mercury cathode cell in its operation is to keep the distance between the cathode and anode to a practical minimum size. However, as the anode, such as a graphite anode that is used industrially, is consumed during the electrolytic operation, in order to keep the distance between the cathode and anode in a fixed range, some device for adjusting the distance between both electrodes is required. A considerable number of devices have been proposed for effecting adjustment of the distance between both electrodes wherein spacers in the form of a pyramid, cone or upper-knife-edged shape are placed between the bottom plate of the cathode and the lower surface of the anode for such purpose.

Now, in order to maximize the electric power efficiency, it is specifically desirable that the upper surface of bottom portion of the amalgamating chamber is made of an electrically conductive material (such as an iron or steel plate) which can be wetted with mercury or amalgam. However, when the spacers are rested or fixed on the surface of such bottom portion of the amalgamating chamber by means of cementing, screwing or fitting, several disadvantages will be encountered and the device will not be practicable. The fatal disadvantages in such case are that the bottom portion will be corroded rapidly in the rear (on the lower side of the flow of the mercury cathode) of the spacer and will be corroded gradually at the portion near and under the lower surface of the spacer.

An object of the present invention is to provide an electrolytic cell wherein such difficulties as are mentioned above are eliminated and automatic adjustment of the electrode distance by spacers is possible.

In this invention, the horizontal mercury cathode cell for electrolysis of alkali chloride solutions has an amalgamating chamber having a bottom portion made at least partially of an electrically conductive material which is preferably wettable with mercury or amalgam, for example, an iron or steel plate or an iron or steel plate plated with silver. It is preferable that substantially the entire upper surface of said bottom portion on which the liquid electrode flows is made of an electrically conductive material. At least two grooves are made in said bottom portion of the amalgamating chamber in the direction of flow of the liquid electrode, said grooves are preferably continuous and extend over substantially the entire length or more than 90% of the length of the bottom portion of the amalgamating chamber. When said grooves are not continuous but rather are intermittent or interrupted it is preferable that said grooves in each group are arranged in a straight line and that the total length of the grooves in each group is more than 90% of the length of the bottom portion of the amalgamating chamber. At least one anode supporter supporting body is fitted in each of said grooves. Said anode supporter supporting body is made of substantially the same material as the electrically conductive bottom portion of the amalgamating chamber at least on the upper surface, the other surface on the anode side and the side surface. At least one anode supporter is fixed on the upper surface of the supporting body. When only one anode supporter supporting body is fitted in said groove, the anode supporter supporting body has preferably a length corresponding substantially to the length of the groove, and when two or more anode supporter supporting bodies are fitted in each of grooves, the total length of said anode supporter supporting bodies fitted in each groove preferably substantially corresponds to the length of the groove. The upper surface of said anode supporter supporting body is preferably on substantially the same level as the side edge of said groove, and a clearance of 0.05 to 1 mm. wide is provided between the side surface of said supporting body and the side wall of said groove. The anode supporter has a length of at most 100 mm. and has at least one anode supporting surface less than 3 mm. or preferably less than 2 mm. long at least in one dimension and has a streamline-like form on the outer periphery on the bottom part, and is made of an electrically insulating material at least on its outside surface except the base surface. The anode supporters are fixed and arranged at proper intervals on the bottom portion of the amalgamating chamber so that, when the anode is mounted on them anodes can be supported on the upper surfaces of them and the inter-electrode space may be kept to a practical minimum size during operation. It is preferable that the bottom portion of the amalgamating chamber is sloped downwardly on the opposite sides of the groove.

Further, the above mentioned anode supporting surface may be either flat or curved. It is not preferable in practice to make said surface approximately a line or a point and its minimum width should be about 0.5 mm. in practice.

It is most practically advantageous and gives favorable results to make said grooves in the bottom portion of the amalgamating chamber so as to be of a fixed width. Usually, as the side walls of the amalgamating chamber are made parallel with each other, it is preferable in working to provide grooves of a fixed width parallel with the side walls of the amalgamating chamber.

It is preferable to make the width of the upper surface of said anode supporter supporting body less than 20 mm. It is most effective to make said width 5 to 10 mm. The thickness of said supporting body may be properly selected to be any suitable size but it is large enough in practice if it is in the range of 2 to 5 mm.

Though the sizes and shapes of said groove and anode supporter supporting body are determined and are correlated with each other, the width of the clearance between the side wall of the groove and the side of the anode supporter supporting body is specifically preferably 0.2 to 0.6 mm. in the opening part and the opening part of said clearance is specifically preferably straight and continuous over substantially the entire length of the bottom plate of the amalgamating chamber. Even in case the opening part is intermittent or interrupted, it is preferable that the lengths of the openings are arranged in a straight line and the sum of the lengths exceeds 90% of the length of the bottom portion of the amalgamating chamber.

The anode supporter supporting body can be fixed by being fitted in the groove so as not to interfere with the electrolytic operation. However, as required, it can be fixed to the bottom plate of the amalgamating chamber by such proper method as welding, cementing or calking. However, in this latter case, the structure characterizing the present invention must not be altered by such securing method and the anode supporter supporting body must be removable from the groove without substantially hurting the bottom portion of the amalgamating chamber.

The width of the anode supporter must not exceed the width of the upper surface of the anode supporter supporting body. Its maximum width is less than 10 mm., preferably 3 to 8 mm. Its height is determined by the thickness of the mercury cathode and the distance to be kept between both electrodes but is usually preferably 4 to 8 mm. One of the most important shapes of the parts of the anode supporter is the shape of the outer periphery of the lower surface or of the lower part of the peripheral wall of the anode supporter which can come into contact with the fluid mercury cathode. It can be in the form of a circle, ellipse, streamline or the like and is substantially symmetrical on the right and left with respect to the axis along the flow of the mercury. In case it has long and short axes, the long axis should be placed along the flow of the mercury cathode. In case the head part and tail part are separated from each other by taking the function of the streamline form into consideration, the head part should be located in the upper part of the mercury flow. In such case, a streamline or the like in which the length is 4 to 16 times as large as the width and is practically 35 to 70 mm. will be preferable.

Such proper means as cementing, screwing or fitting can be selected as a method of fixing the anode supporter on the anode supporter supporting body.

The electrical insulating material can be selected from those already known. A fluorine-containing resin, vinyl chloride resin, reinforced thermosetting resin or ceramic ware can be used as such.

Some electrolytic cells embodying the present invention shall be explained in the following with reference to the drawings in which:

FIGURE 1 is a partial plan view of an electrolytic cell with the cell cover and anode removed and embodying the present invention;

FIGURE 2 is a cross-sectional view of a spacer part;

FIGURE 3 is a longitudinal sectional view of the spacer part;

FIGURE 4 is an enlarged plan view of the spacer part illustrated in FIGURE 1;

FIGURE 5 is a cross-sectional view of an electrolytic cell according to the present invention;

FIGURE 6 is a cross-sectional view of a modified electrolytic cell embodying the present invention and illustrates only the bottom part and side wall parts of the cell;

FIGURE 7 is a partial plan view of the electrolytic cell in FIGURE 6 with the cell cover and anode removed;

FIGURE 8 is a partial view of an anode supporting structure used in the electrolytic cell in FIGURE 6, in which FIGURE 8a is a side view of an anode supporter attached to a strap (anode supporter supporting body), FIGURE 8b is a plan view of the same and FIGURE 8c is a cross-sectional view of the anode supporting structure fitted in the bottom plate of the cell;

FIGURE 9 is a cross-sectional view of an amalgamating chamber part of a further modified electrolytic cell embodying the present invention;

FIGURE 10 is a plan view of an amalgamating chamber part of the electrolytic cell in FIGURE 9 with the cell cover and anode removed;

FIGURE 11 is a view of another anode supporting structure embodying the present invention used in the electrolytic cell in FIGURE 9, in which FIGURE 11a is a side view of the anode supporter attached to a strap, FIGURE 11b is a plan view of the same and FIGURE 11c is a cross-sectional view of the strap carrying the anode supporters and fitted in a fine groove in the bottom plate of the amalgamating chamber, FIGURE 12 is a cross-sectional view of the amalgamating chamber part of another modified electrolytic cell embodying the present invention with the cell cover and anode removed;

FIGURE 13 is a plan view of the amalgamating chamber part of the electrolytic cell in FIGURE 12 with the cell cover and anode removed;

FIGURES 14 and 15 are cross-sectional views illustrating modified shapes of fine grooves and anode supporter supporting bodies provided in the electrolytic cell of the present invention;

FIGURES 16, 17 and 18 are views illustrating several anode supporters which can be used in the electrolytic cell embodying the present invention, in which FIGURES 16a, 17a and 18a are elevations, FIGURES 16b, 17b and 18b are side views and FIGURES 16c, 17c and 18c are plan views;

FIGURE 19 is a view illustrating the shapes of the outer peripheries of the lower surfaces of anode supporters which can be used in the present invention.

In FIGURES 1 to 5, there is provided a cathode bottom part of a structure wherein two fine grooves 6, which extend parallel to the direction of the flow of mercury, are made in an electrically conductive cathode bottom plate 1 of an amalgamating chamber. In each of said grooves 6 is fitted and fixed a strap 3 which is made of substantially the same material as the cathode bottom plate 1. Anode supporters (spacers) 4 are provided on the straps 3 and are arranged at proper spaced intervals thereon. The supporters 4 are made of an electrically insulating material, and in plan view (see FIGURE 4) have a streamline shape having the head part 4a facing the direction from which mercury flows and whose peak or crest 4c (see FIGURES 3 and 4) is in contact with the lower surface of an anode plate 5 along a line parallel with said bottom plate 1.

A clearance 7 is provided between the side surface of strap 3 and each side wall of the groove 6 so that a small amount of amalgam may accumulate in said clearances 7.

The anode supporter 4 is several cm. long and is about 1 cm. wide. The upper surface of the strap 3 and the upper surface of the cathode bottom plate 1 are on substantially the same level so as to be in the same plane.

FIGURES 1, 2, 3, 4 and 5 illustrate an electrolytic cell embodying the present invention. The cathode bottom plate 1 made of soft steel is set on the bottom surface of an electrolytic chamber formed of the outer walls 2 of the electrolytic cell. Two fine shallow grooves 6 are made in said bottom plate 1. A strap 3 made of soft steel is fitted in each of said grooves 6. Anode supporters 4 made of Teflon are fixed on the upper surface of said strap 3. An anode 5 is supported on the peaks and crests 4c of said anode supporters 4.

FIGURE 6 is a cross-sectional view of an amalgamating chamber in an electrolytic cell according to the present invention and illustrates only the bottom part and side wall parts of the cell. Said amalgamating chamber has a bottom plate 1 made of a steel plate and side walls 2. Said side wall 2 is formed of a steel member 2a and a rubber lining layer 2b. A pair of fine grooves 6 are made in the steel bottom plate 1. A strap (an anode supporter supporting body) 3 on which are fixed many anode supporters 4 is fitted in said fine groove 6. A clearance 7 is provided between the groove 6 and the strap 3. The upper surface 1a of the bottom plate 1 of the amalgamating chamber and the upper surface 3a of the strap 3 are made to have the same level.

FIGURE 7 is a partial plan view of such amalgamating chamber as in FIGURE 6 with the cell cover and anode removed. The amalgamating chamber has the bottom plate 1 and side walls 2. A strap 3 on which anode supporters 4 are fixed at proper intervals is fitted in each of a pair of fine grooves. A clearance 7 is provided between the side wall of the fine groove and the side wall of the strap 3.

FIGURE 8 is a magnified view of a part of each of FIGURES 6 and 7. (a) is a side view of an anode supported 4 fixed to the strap 3. The anode supporter 4 has many narrow surfaces 4c to be in contact with the lower surface of the anode. (b) is a plan view of the anode supporter 4 fixed to the strap 3 illustrated in the view (a). The outer periphery of the plan view of the anode supporter is in the form like a streamline. Many narrow surfaces 4c to be in contact with the lower surface of the anode are made on the anode supporter. (c) is a partial magnified view of FIGURE 6. Fine grooves 6 are made in the bottom plate 1 of the amalgamating chamber. A strap 3 on which are fixed anode supporters 4 is fitted in each groove 6. The upper surface 1a of the bottom plate of the amalgamating chamber and the upper surface 3a of the strap are on the same level. A clearance 7 is provided between the side wall of the fine groove 6 and the side of the strap.

FIGURE 9 is a cross-sectioned view of an amalgamating chamber consisting of a bottom plate 1 made of a steel plate, side walls 2 and a cell cover 9. Fine grooves 6 having sloped parts 8 on the peripheries are made in the bottom plate 1. An anode supporter supporting body 3 in the form of a strap on which are fixed anode supporters 4 is fitted in each fine groove 6. A graphite anode 10 is mounted and supported on the anode supporting surfaces of the anode supporters 4.

FIGURE 10 is a plan view of such amalgamating chamber parts as in FIGURE 9 with the cell cover and anode removed and illustrates side walls 2 parallel with each other and a bottom plate. A pair of fine grooves 8 of a fixed width parallel with each other are made in the bottom plate 1 of the amalgamating chamber. It is needless to say that 3 or more or 2 pairs or more of such grooves 8 can be made as required.

Sloped parts 8 are made on the peripheries of the grooves 8 can be made as required.
3 in the form of a strap which ranges substantially over the entire length of the groove and on which many anode supporters 4 are fixed at regular intervals is fitted in each of the fine grooves 8. Two clearances 7 are thus made in each groove.

FIGURE 11 is a magnified view of a part of such component parts of the amalgamating chamber as are illustrated in FIGURES 9 and 10. (a) is a side view of the anode supporter 4 and the strap 3 on which the anode reporter is fixed. (b) is a plan view of the same wherein the anode supporter has a fine long anode supporting surface 4c less than 2 mm. wide. (c) is a cross-sectioned view of the strap carrying the anode supporters and fitted in a fine groove 6 made in the bottom plate 1 of the amalgamating chamber. A slope 8 ranging from 8b to 8a is made from the upper surface 1a of the bottom plate of the amalgamating chamber to the groove. The upper surface 3a of the strap 3 which is fitted in the fine groove 6 and on which are fixed the anode supporters 4 and the lower end 8a of the slope are on the same level. There is a clearance 7 between the side wall of the groove and the side of the strap 3.

FIGURE 12 is a cross-sectional view of an amalgamating chamber formed of a bottom plate 1 made of a steel plate and side walls 2 each consisting of a structural member 2a made of steel and a rubber lining layer 2b. A pair of fine grooves are made in the bottom plate 1. A slope beginning at 8b and ending at 8a is made on each peripheral side of the groove. An anode supporter supporting body 3 on which are fixed anode supporters 4 is fitted in each fine groove 6.

FIGURE 13 is a plan view of such amalgamating chamber as in FIGURE 12 with the cell cover and anode removed. The amalgamating chamber consists of side walls 2 parallel with each other and a bottom plate 1. A pair of fine grooves parallel with each other are made in the bottom plate. Each groove has a sloped part 8 ranging from 8b to 8a on each peripheral side and is of a fixed width over the entire length of the bottom plate of the amalgamating chamber. Many anode supporter supporting bodies 3 on each of which is fixed an anode supporter 4 are fitted in the fine groove. The clearance 7 between the side wall of the fine groove and the side of the anode supporter ranges over the entire length of the bottom plate 1 of the amalgamating chamber.

FIGURES 14 and 15 are cross-sectioned views illustrating the shapes of grooves and anode supporter supporting bodies. In either case, such groove 6 as is illustrated is made in the conductive bottom plate 1 of the amalgamating chamber. A sloped part 8 ending at the lower end 8a is made on each peripheral side of the groove. Such anode supporter supporting body 3 as is illustrated is fitted in the groove. Its upper surface 3a is substantially on the same level as of the lower end 8a of the sloped part.

FIGURES 16, 17 and 18 are views illustrating the shapes of anode supporters. (a) is an elevation. (b) is a side view. (c) is a plan view. The body 4 has an anode supporting surface 4c in the upper part.

FIGURE 19 illustrates three examples of the outer peripheries of the lower surfaces of anode supporters. The one in (b) has a head part 4a and a tail part 4b.

The advantages of the present invention shall be described in the following. As the anode in the electrolytic cell according to the present invention is supported on the lower surface by limited supporting surfaces of anode supporters having limited areas, even in the normal electrolytic operation, the distance between the cathode and anode can be always kept in a substantially fixed range, the electrolysis is possible with such small distance between both electrodes as is in a technically allowable limit and the operation can be carried out at a high electric power efficiency. Thus, as a result, the operation can be carried out with the minimum amount of mercury.

It is needless to say that the shape of the lower part of the anode supporters to be used in the present invention is specifically taken into consideration to prevent the mercury flow from being cut. However, the anode supporters in the present invention are fixed on the upper surface of the anode supporter supporting body of which at least the upper surface, anode sides and side surfaces are formed of substantially the same material as of the conductive bottom plate of the amalgamating chamber and clearances opening to contain mercury or analgam are provided between the anode supporter supporting body and the conductive bottom plate of the amalgamating chamber so that specifically mercury may be prevented from being cut and the corrosion of the bottom part of the amalgamating chamber may be prevented. Further, in the present invention, by connecting the above mentioned clearances to the sloped parts directed downward to the clearances, the corrosion of the bottom part of the amalgamating chamber can be prevented without cutting the mercury even when the amount of mercury is small.

With the structure of the electrolytic cell of the present invention, even if the bottom part of the amalgamating chamber happens to be corroded, in fact, only the anode supporter supporting body will be corroded. Therefore, in such case, by replacing only the corroded anode supporter supporting body, the structure can be simply restored.

In the figures, the sealed state between the rod of the anode and the cell cover is omitted. However, in such case as in FIGURE 9, by filling the clearance with a known conventional viscous sealing material, the clearance can be sealed so that anode may fall. However, any other sealing methods which can show the same function can be adopted.

We claim:

1. In a horizontal mercury cathode cell for the electrolysis of alkali chloride solutions, a bottom member of an amalgamating chamber comprised of:
   a bottom plate made of electrically conductive material and along which the liquid cathode flows;
   wall means defining at least two elongated parallel grooves in the upper side of said bottom plate and extending in the direction of the flow of the liquid cathode, said grooves each having a length more than 90 percent of the entire length of said bottom plate and having parallel upper edges;
   elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.05 to 1 mm.;
   a plurality of anode supporters made of electrical insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having narrow and projecting anode supporting portions located along the upper side thereof, said anode supporting portions having a length of less than 3 mm. at least in one dimension, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions.

2. In a horizontal mercury cathode cell for the electrolysis of alkali chloride solutions, a bottom member of an amalgamating chamber comprised of:
   a bottom plate made of electrically conductive material and along which the liquid cathode flows;
   wall means defining at least two elongated parallel grooves in the upper side of said bottom plate and extending in the direction of the flow of the liquid cathode, said grooves each having a length more than 90 percent of the entire length of said bottom plate and having parallel upper edges;
   elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.05 to 1 mm.;
   a plurality of anode supporters made of electrically insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having an anode supporting portion located along the upper side thereof, said anode supporting portion having a knife-edge shape and a height of from 4 to 8 mm. from the upper surface of said anode supporter supporting body, said anode supporters being fixed on the upper surfaces of said anode supporter supporting bodies spaced at intervals therealong thereby to leave parts of the upper surfaces of said anode supporter supporting bodies uncovered by said anode supporters, said anode supporters contacting the undersurfaces of the anodes at said anode supporting portions.

3. In a horizontal mercury cathode cell for the electrolysis of alkali chloride solutions, a bottom member of an amalgamating chamber comprised of:
   a bottom plate made of electrically conductive material and along which the liquid cathode flows;
   wall means defining at least two elongated parallel grooves in the upper side of said bottom plate and extending in the direction of the flow of the liquid cathode, said grooves each having a length more than 90 percent of the entire length of said bottom plate and having parallel upper edges;
   elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.05 to 1 mm.;
   a plurality of anode supporters made of electrical insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having anode supporting portions located along the upper side thereof, said anode supporting portions having sawteeth shapes and a height of from 4 to 8 mm. from the upper surface of said anode supporter supporting body, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions.

4. In a horizontal mercury cathode cell for the electrolysis of alkali chloride solutions, a bottom member of an amalgamating chamber comprised of:
   a bottom plate made of electrically conductive material and along which the liquid cathode flows:
   wall means defining at least two elongated parallel grooves in the upper side of said bottom plate and extending in the direction of the flow of the liquid cathode, said grooves each having a length more than 90 percent of the entire length of said bottom plate and having parallel upper edges;

elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.05 to 1 mm.;

a plurality of anode supporters made of electrical insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having anode supporting portions located along the upper side thereof, said anode supporting portions comprising a plurality of circular stems of from 0.5 to 2 mm. in diameter and a height of from 4 to 8 mm. projecting upwardly from the upper surface of said anode supporter supporting body, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions.

5. In a horizontal mercury cathode cell for the electrolysis of alkali chloride solutions, a bottom member of an amalgamating chamber comprised of:

a bottom plate made of electrically conductive material and along which the liquid cathode flows;

wall means defining at least two elongated parallel grooves in the upper side of said bottom plate and extending in the direction of the flow of the liquid cathode, said grooves each having a length more than 90 percent of the entire length of said bottom plate and having parallel upper edges;

elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.05 to 1 mm.;

a plurality of anode supporters made of electrical insulating material and having a streamline-like form on the outer surface on the bottom portion thereof, said supporters having a width being less than 10 mm. and not exceeding the width of the upper surfaces of the corresponding anode supporter supporting bodies and having a length of from 35 to 77 mm. which is from 4 to 16 times the width of said supporters, said supporters having narrow and projecting anode supporting portions located along the upper side thereof, said anode supporting portions having a length of 0.5 to 2 mm. at least in one dimension and a height of from 4 to 8 mm. from the upper surface of said anode supporter supporting body, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions.

6. In a horizontal mercury cathode cell for the electrolysis of alkali chloride solutions, a bottom member of an amalgamating chamber comprised of:

a bottom plate made of electrically conductive material and along which the liquid cathode flows;

wall means defining at least two elongated parallel grooves in the upper side of said bottom plate and extending in the direction of the flow of the liquid cathode, said grooves each having a length more than 90 percent of the entire length of said bottom plate, having a depth of from 2 to 5 mm. and having parallel upper edges;

elongated anode supporter supporting bodies made of an electrically conductive material and having a strip-like shape, said bodies being of less width than said grooves and having a width of from 5 to 10 mm. and having a thickness of from 2 to 5 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate and having a width of from 0.2 to 0.6 mm.;

a plurality of anode supporters made of electrical insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having narrow and projecting anode supporting portions located along the upper side thereof, said anode supporting portions having a length of from 0.5 to 2 mm. at least in one dimension and a height of from 4 to 8 mm. from the upper surface of said anode supporter supporting body, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions.

7. In a horizontal mercury cathode cell for the electrolysis of alkali chloride solutions, a bottom member of an amalgamating chamber comprised of:

a bottom plate made of an electrically conductive material and along which the liquid cathode flows;

wall means defining at least two elongated parallel grooves in the upper side of said bottom plate and extending in the direction of the flow of the liquid cathode, said grooves each having a length more than 90 percent of the entire length of said bottom plate and having parallel upper edges;

elongated anode supporter supporting bodies made of an electrically conductive material and having a strip-like shape, said bodies being of less width than said grooves and having a width of less than about 20 mm., said bodies being received in said grooves so that the upper surfaces of said bodies are on about the same level with the upper edges of said grooves and pairs of elongated parallel narrow clearance spaces are formed between the side surfaces of said anode supporter supporting bodies and the sidewalls of said grooves, said clearance spaces having a length of more than 90 percent of the length of said bottom plate;

a plurality of anode supporters made of electrical insulating material and having a streamline-like form on the outer surface on the bottom portion thereof, said supporters having a width of less than 10 mm. and not exceeding the width of the upper surfaces of the corresponding anode supporter supporting bodies and having a length of from 35 to 70 mm. which is from 4 to 16 times the width of said supporters, said supporters having narrow and projecting anode supporting portions located along the upper side thereof, said anode supporting portions having a length of less than 3 mm. at least in one dimension and a height of from 4 to 8 mm. from the upper surface of said anode supporter supporting bodies, said anode supporters being fixed on the upper surfaces of said anode supporter supporting bodies at spaced intervals therealong thereby to leave parts of the upper surfaces of said anode supporter supporting bodies uncovered by said anode supporters, said anode supporters contacting the undersurfaces of the anodes at said anode supporting portions, said bottom plate being sloped downwardly toward said clearance spaces on the sides of the grooves.

References Cited

UNITED STATES PATENTS

| | | | |
|---|---|---|---|
| 2,596,583 | 5/1952 | Meiklejohn | 204—250 |
| 2,649,411 | 8/1953 | Shaw et al. | 204—250 |
| 2,680,092 | 6/1954 | Shaw et al. | 204—219 |
| 2,895,894 | 7/1959 | Conforto | 204—219 |

FOREIGN PATENTS

| | | |
|---|---|---|
| 1,123,652 | 2/1962 | Germany. |
| 325,451 | 12/1957 | Switzerland. |

JOHN H. MACK, *Primary Examiner.*

HOWARD S. WILLIAMS, *Examiner.*

DONALD R. VALENTINE, *Assistant Examiner.*